April 12, 1966 H. KOZEL 3,245,644
PORTABLE PROJECTION SCREEN ASSEMBLY
Filed Oct. 5, 1964 4 Sheets-Sheet 1
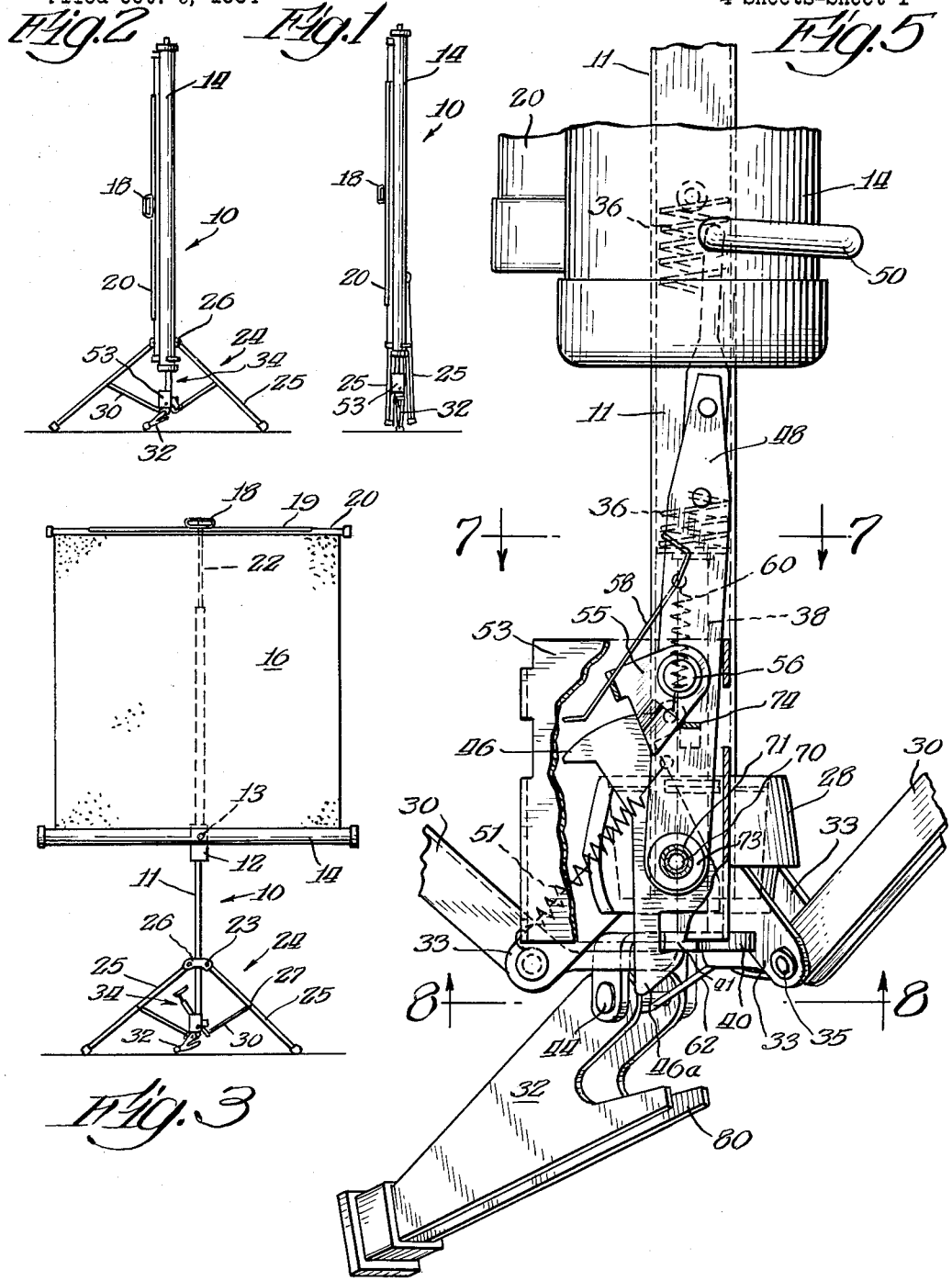
Inventor:
Harry Kozel
By Bair Freeman & Molinare Attys

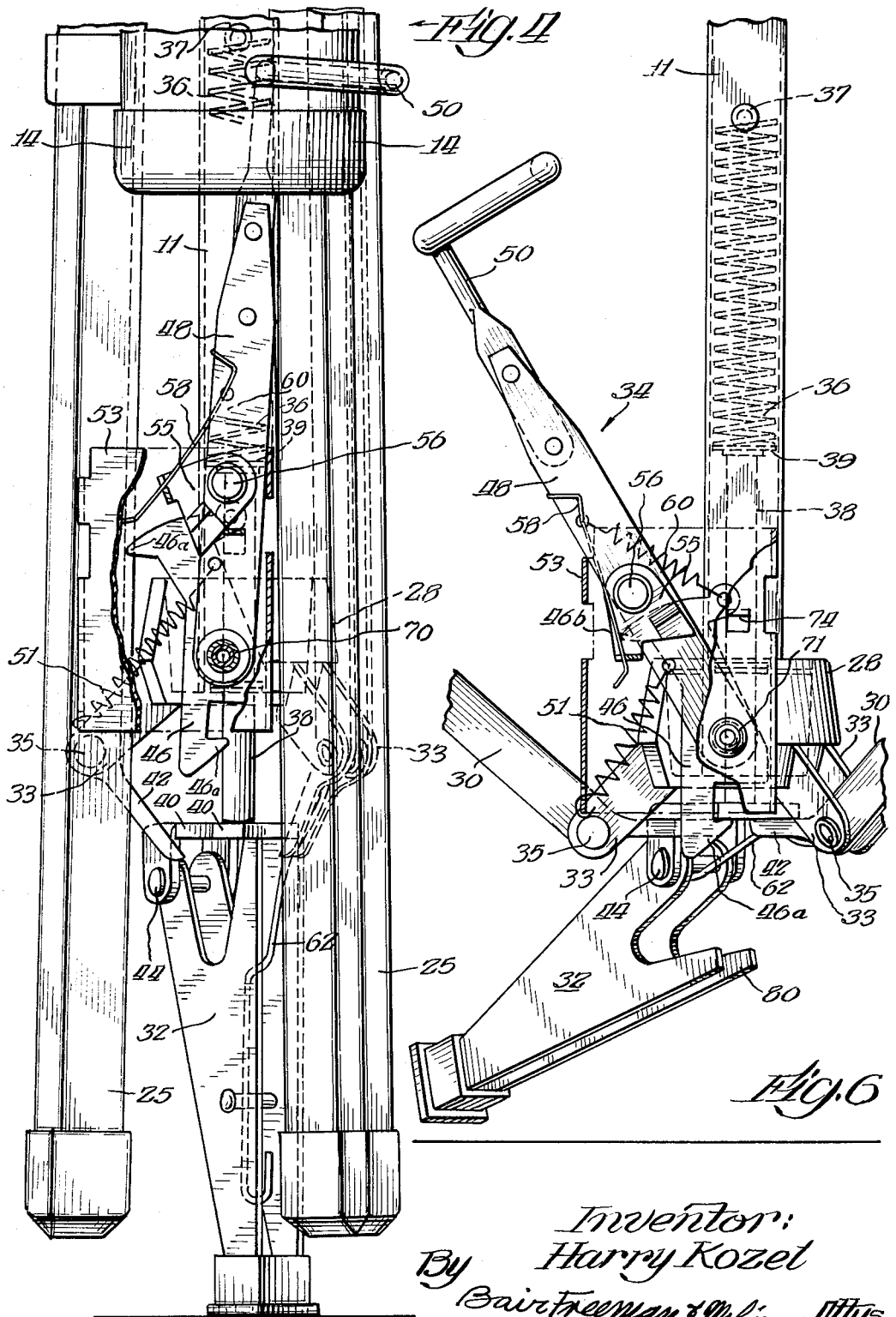

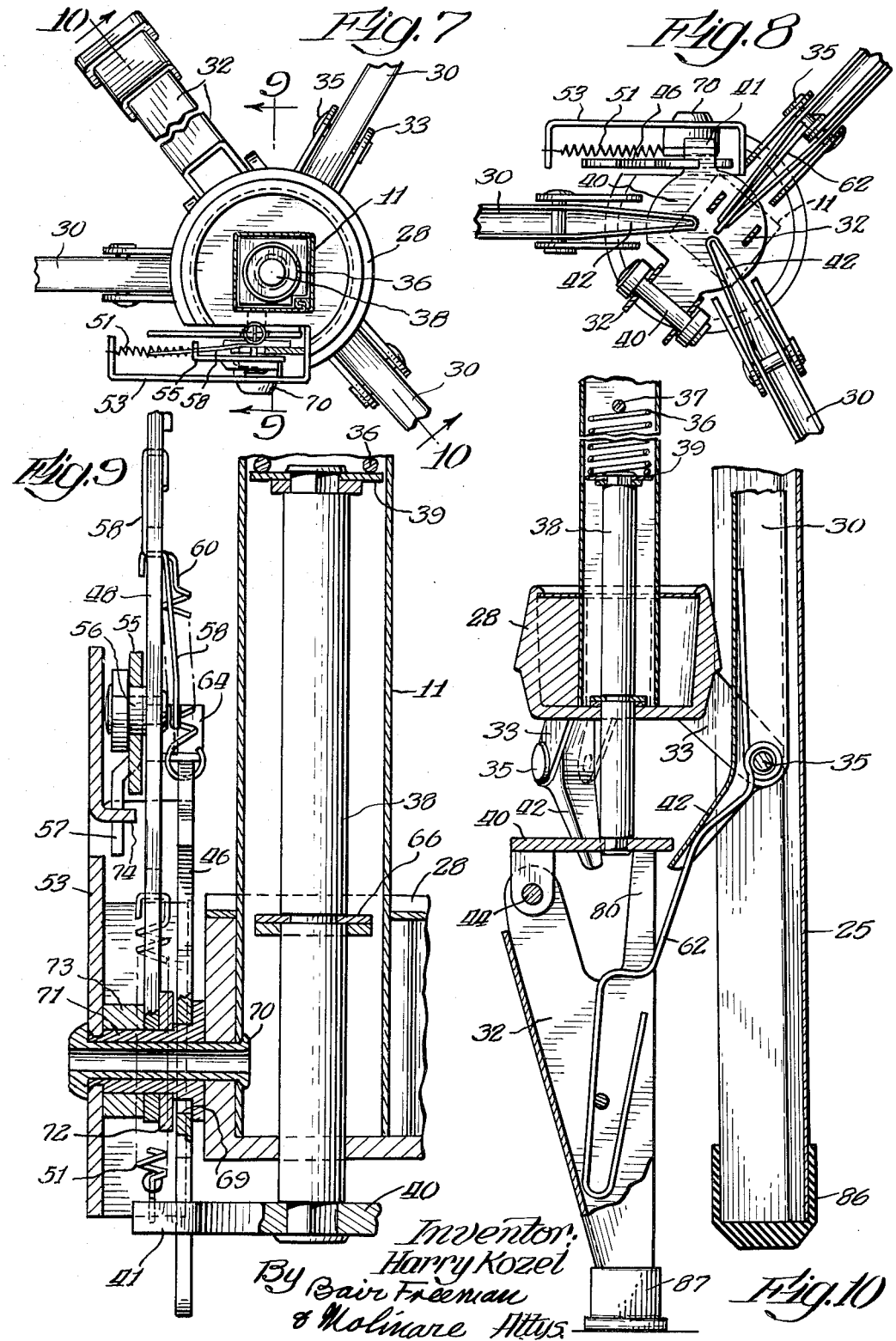

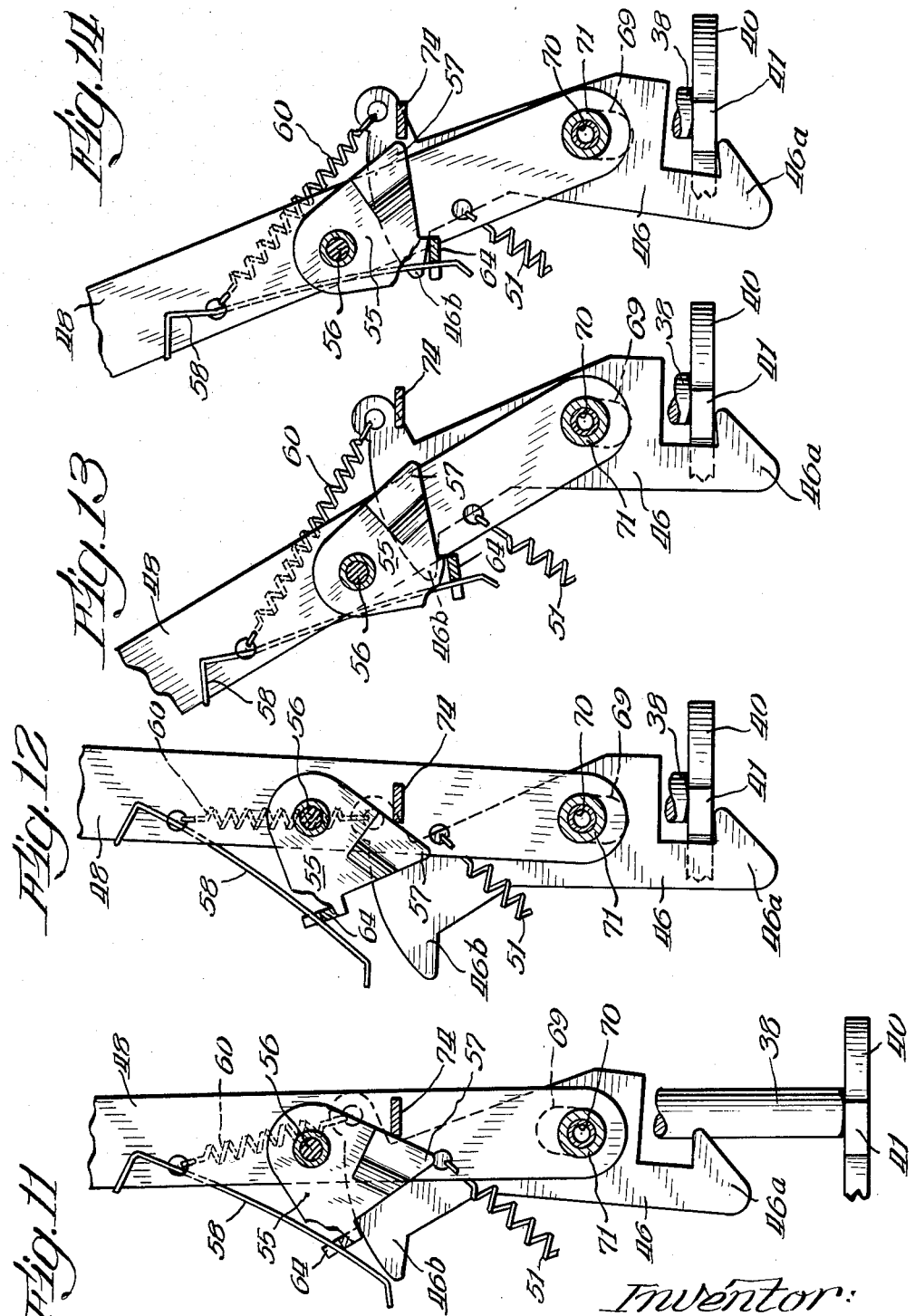

United States Patent Office 3,245,644
Patented Apr. 12, 1966

3,245,644
PORTABLE PROJECTION SCREEN ASSEMBLY
Harry Kozel, Bensenville, Ill., assignor to Radiant Manufacturing Corporation, a corporation of Illinois
Filed Oct. 5, 1964, Ser. No. 401,521
8 Claims. (Cl. 248—171)

This invention relates to a portable projection screen assembly and, more particularly, to an improved projection screen assembly incorporating means for automatically moving the supporting stand means from extended column-supporting position to retracted storage position.

An object of this invention is to provide an improved portable projection screen assembly having novel means for automatically retracting the supporting stand when the stand is raised from the floor after use, such retracting means comprising a biased slider within the vertical column which is adapted to be cocked during the make-ready procedure, released for actuation of the legs comprising the stand when the screen housing is moved from horizontally disposed use position to upright storage position, and then automatically operative to move the legs to the retracted position when the portable projection screen assembly is raised from the floor.

Another object of this invention is to provide an improved portable projection screen assembly having supporting leg retracting means comprising a spring-biased slider for urging the legs to retracted position, a foot operatively connected to the slider and extending beyond the legs when the legs are in retracted position for compressing the leg-actuating spring biasing the slider, latch means for retaining the leg-actuating spring compressed, and release means responsive to movement of the screen housing for releasing the latch and thereby permitting the spring to actuate the legs from extended supporting position to retracted position when the portable projection screen assembly is raised from the floor after use. Further objects and advantages of this invention will become more apparent hereafter.

The specific structural details of a preferred embodiment of the invention and the mode of functioning will be made most manifest and particularly pointed out in clear, concise and exact terms in conjunction with the accompanying drawings, wherein:

FIGURE 1 is a side elevation view of the portable projection screen assembly of this invention with the supporting legs retracted and with the screen housing arranged vertically;

FIGURE 2 is a side elevation view of the portable projection screen assembly with the legs of the supporting stand extended and with the screen case arranged vertically;

FIGURE 3 is a side elevation view of the portable projection screen assembly in position for use with the screen housing disposed horizontally and with the screen extended;

FIGURE 4 is an enlarged detail view of the portable projection screen assembly with parts broken away to more clearly illustrate the position of the elements of the retracting means as the depending foot is engaged with the floor preparatory to compressing the leg actuating spring;

FIGURE 5 is an enlarged detail view of the portable projection screen assembly with parts broken away to more clearly illustrate the position of the elements of the retracting means after the spring has been compressed and the leg means are free to move to the extended position, with the screen housing being shown in upright position;

FIGURE 6 is an enlarged detail view of the portable projection screen assembly with parts broken away to more clearly illustrate the position of the elements of the retracting means when the vertical column is supported on the floor and with the screen housing pivoted to the horizontal use position shown in FIGURE 3;

FIGURE 7 is a horizontal sectional view taken generally along the line 7—7 of FIGURE 5;

FIGURE 8 is a horizontal sectional view taken generally along the line 8—8 of FIGURE 5;

FIGURE 9 is a vertical sectional view taken generally along the line 9—9 of FIGURE 7;

FIGURE 10 is a vertical sectional view taken generally along the line 10—10 of FIGURE 7; and FIGURE 11–14 are enlarged views partially in section, illustrative of the sequential positions of the release arm, leg opener pawl, pawl stop, latch, and slider relative to one another during operation.

Referring to FIGURES 1–3, there is illustrated a portable projection screen assembly 10 embodying the present invention. The assembly 10 comprises an elongated tubular upright or vertical column 11 which may be square (as shown) or triangular in cross section.

Movably supported on the upright 11 is a handle 12 which is retained in suitable adjusted position on the upright 11 by means of a nipping lever (not shown) in conventional manner. The screen housing 14 is carried by the handle 12 and is adapted to be moved about pivot 13 from an upright retracted or storage position to a generally horizontal use or picture exhibiting position. Carried within the screen housing 14 is a biased roller upon which the screen 16 is adapted to be supported. In use, the screen 16 is unrolled and the bail 18 affixed to resilient member 19 on the supporting slat 20, is adapted to be engaged with the top end of the extension rod 22. The rod 22 is telescopically received within the upright 11 and is adapted to be supported in selected adjusted position by means of a nipping lever (not shown) in a conventional manner.

Stand means 24 are provided to support the vertical column 11 in upright use position. The stand means 24 comprise a plurality of legs 25, generally three in number, which are pivoted at their upper ends as indicated at 23 to an upper leg bracket 26 slidably carried on the upright or tube 11. Fixed to the bottom of the upright 11 is a lower leg bracket 28. Links or braces 30 are each pivotally connected at one end to the lower bracket 28 and at the other end to the legs 25, as indicated at 27. The legs 25 may be folded together for transportation and storage purposes and when this is done the bracket 26 slides upwardly on the upright or tube 11.

The means for automatically retracting the legs 25 are disposed at the lower end of upright 11. Such means include a depending foot 32 pivotally carried at the lower end of a slider or plunger which is biased downwardly by a spring disposed within the lower portion of upright 11. When the assembly 10 is moved downwardly with respect to foot 32, the spring is compressed. A leg release assembly including latch means are provided for retaining the spring compressed within the upright 11. With the spring compressed, the legs 25 are permitted to move from retracted position (shown in FIGURE 1) to extended position (shown in FIGURES 2 and 3) by means of gravity bias or spring bias. The leg release assembly 34, which is responsive to movement of the screen housing 14, has means for releasing the latch from engagement with the plunger so as to permit automatic closure of the legs 25 when the portable projection screen assembly is raised from the floor after use.

Turning to FIGURE 4, there is illustrated on an enlarged scale a detail of the projection screen assembly with the elements being shown in the same position as illustrated in FIGURE 1. Prior to use, the compression spring 36 disposed within the upright 11 is extended for biasing the plunger or slider 38 downwardly or outwardly from upright 11. At its upper end, spring 36 bears against confining means fixed to upright 11. Such confining means may comprise a pin 37 (as shown) or lugs struck from the walls of upright 11. At its lower end, the spring bears upon an annular stop or guide 39 affixed to plunger 38. The plunger base 40, which is rigidly connected to the plunger 38, engages the short legs 42 on the ends of the braces 30, thereby pivoting the braces about pivot pins 35 carried in arms 33 extending downwardly and outwardly from bracket 28. The upper ends of the braces 30 are urged inwardly, thereby moving the legs 25 into retracted position and retaining the legs in retracted position.

To compress the spring 36 and thereby permit extension of the legs 25, the depending foot 32, which is pivoted on the pivot pin 44 affixed to projections depending from the plunger base 40, is positioned on a supporting surface as shown in FIGURE 4, in axial alignment with the upright 11. As the portable projection screen assembly is urged downwardly with respect to the floor, the depending foot 32, which extends below the legs 25, will be moved relative to the upright 11, urging plunger or slider 38 inwardly into upright 11 and compressing the spring 36. Latch 46 which is pivotally supported on the bracket 28 is biased into engagement with lug 41 on the plunger base 40 for engaging hook portion 46a on the latch with base 40 to retain the spring 36 compressed.

The leg release assembly 34 includes an arm and pawl assembly having an arm 48 which is journaled at its lower end on bushing 71. Affixed to the upper end of the arm 48 is an extension member 50, which is adapted to be engaged by an end of the screen casing 14. The screen casing 14 maintains the arm 48 in the position shown in FIGURE 4 against the bias of spring 51, which is affixed at one end to the arm 48 and at the other end to the cover member 53.

The leg opener pawl 55, which is journaled on pawl bushing 56 carried on arm 48, is disposed above the latch 46 and is inoperative at this time. The leg opener pawl 55 is biased counterclockwise about bushing 56 as viewed in FIGURE 4 by the pawl spring 58.

The latch spring 60 connected at one end to the latch 46 and at the other end to the arm 48 is arranged normally to move the latch 46 toward a position for engagement with plunger base 40. This operation will be more fully explained hereafter.

The foot 32 is moved from a position in axial alignment with plunger 38 (FIGURE 4) to a position out of alignment therewith (FIGURE 5) by an elongated wire member 62 operatively connected between a brace 30 and foot 32.

After the plunger base 40 has been engaged by the latch 46 to hold the spring 36 compressed, the assembly 10 is raised from the ground and the legs 25 are biased downwardly by gravity. If desired, the opening of the legs 25 may be facilitated by means of coil springs disposed about the pivots 27 between the legs 25 and the braces 30. The position of the leg-retracting means shown in FIGURE 5 corresponds to the showing of the projection screen assembly in FIGURE 2.

Referring now to FIGURE 6, there is illustrated the position of the novel leg-retracting means when the screen housing 14 is rotated about its axis on the handle 12 from a vertical storage position to a horizontal use position. Upon release of the extension portion 50 of the arm 48 from housing 14, the arm spring 51 will bias the arm 48 counterclockwise as viewed in FIGURE 6. The angle lug 64 formed integrally with the leg opener pawl 55 will ride over the upper hook portion 46b of the latch 46 and be positioned beneath the hook 46b at the top end of the latch 46, preparatory to actuating the latch 46 to release the plunger 38 and spring 36.

After use, the screen 16 is rolled back into the screen housing 14 and the housing 14 is pivoted back from a horizontal use position to an upright storage position. The lower end of the screen housing 14 will engage the extension member 50 on the arm 48, causing the lug 64 on the leg opener pawl 55 to engage the hook 46b on the upper end of latch 46, thereby pivoting the latch 46 about an axis through bushing 49 and releasing the hook 46a on the lower end of the latch 46 from the base 40. The spring 36 biases the slider 38 outwardly until the base 40 abuts the short legs 42 on braces 30. The weight of the portable projection screen assembly 10 prevents the legs from retracting. However, when the assembly 10 is raised from the floor or like supporting surface, the legs 25 are automatically retracted.

Referring to FIGURE 7, it is seen that the upright 11 comprises a tube, which in the illustrated form, is square in cross section. In a presently preferred form of the invention, the stand is comprised of three legs. Each leg has an associated brace 30 that is pivoted on a pivot pin 35 supported in arms 33 extending from lower bracket 28.

Rigidly affixed to the top of slider or plunger 38 is a guide 39. The guide has a peripheral edge generally complementary to the interior of upright 11. The guide slides up and down upright 11 and prevents rotation of plunger 38 to properly position lug 41 with respect to hook 46a on latch 46. Further, by preventing rotation of plunger 38, foot 32 carried on base 40 is properly positioned so that it can assume an upright position in axial alignment with upright 11 and plunger 38 without interference from one of the short legs 42 on braces 30.

One corner of guide 39 may be cut out to accommodate the fold-over seam which affixes the ends of the sheet material from which upright 11 may be fabricated.

In FIGURE 8, it is seen that the plunger base 40 engages each of the short legs 42 on the ends of the braces 30 for pivoting the braces about the pivot pin 35 supported in arms 33 on lower bracket 28 to actuate the legs from the extended position to the retracted position when the spring 36 urges the base plunger 40 outwardly from upright 11.

The lug 41, which extends outwardly from the base 40, is engaged by hook portion 46a on latch 46 for retaining the spring 36 compressed within upright 11.

Referring to FIGURE 9, there is illustrated on an enlarged scale, a detail view of the retracting means or actuating means of the present invention. The bracket 28 is affixed to the bottom of the upright 11 by means of a rivet 70 which extends through aligned openings in the upright 11 and the lower bracket 28. Carried concentrically on rivet 70 is a bushing 71. The latch 46 and the arm 48 are each journaled upon the bushing 71. One side of the arm 48 bears upon spacer 12 and the other side of the arm bears upon spacer 73. Spacer 73 abuts the cover 53, which is affixed to the bushing 71 by suitable means, as for example, stake peening as indicated at 76.

The latch 46 is provided with an elongated opening 69 to permit some translational movement of latch 46 with respect to bushing 71. The opening 69 is about the same in width as the outside diameter of bushing 71 and is about one and one-half times as long as the outside diameter of bushing 71. The lost motion arrangement prevents reengagement of the latch 46 with base 40 when the latch 46 is pivoted to release hook 46a, because at this time, spring 60 causes latch 46 to move upwardly with respect to lug 41 on base 40.

The leg opener pawl 55 is pivoted on pawl bushing 56 affixed to the arm 48. The leg opener pawl 55 is provided with an offset portion 57 that is adapted to engage a stop 74 struck out from the cover 53. The offset portion 57 of the pawl 55 cooperates with a stop 74 on the cover 53 to pivot pawl 55 about its axis of rotation to release pawl 55 from engagement with latch 46 as the arm 48 is returned to its upright position upon contact of the extension member 50 with the casing 14 when the screen housing 14 is pivoted back to an upright position. Preferably, stop 74 is struck out from the cover 53. When the hook portion 46b on the latch 46 is released from the right angle lug 64 on the pawl 55, the spring 60 will urge the latch 46 into a position where it will subsequently engage and hold the plunger base 40.

As seen in FIGURES 9 and 10, the rod-like slider or plunger 38 has affixed at its lower end the plunger base 40. Intermediate the ends of the plunger 38, there is affixed a stop 66. The stop 66 engages the interior of the bracket 28 to limit the outward movement of plunger 38 from upright 11. To the top of plunger 38, there is affixed the guide 39 which functions as an abutment shoulder for spring 36 and which prevents rotation of plunger 38 within upright 11.

The foot 32 is pivoted on the base 40 and is formed with a portion 80 that is adapted to engage the lower surface of base 40 at a point spaced from the pivotal connection of the foot to the base when foot 32 is disposed in alignment with the rod 38. As aforenoted, the foot spring 62 coacts between one of the braces 30 and the foot 32 for correlating the movement of the foot 32 with movement of the stand means 24. The spring 62 urges the foot 32 from a position in alignment with the upright 11 and engagement with the floor (FIGURES 1 and 10) to a position wherein the foot is moved out of alignment with the upright and off the floor (FIGURES 2 and 5). Movement of the foot 32 to the offset position shown in FIGURES 2 and 5 occurs when the compression spring 36 is compressed, the assembly 10 is raised from the floor and the legs 25 are permitted to slide downwardly on the upright 11 to an upright-supporting position. When the legs 25 are retracted, the foot 32 is positioned upright in axial alignment with vertical column 11 in readiness for compressing the spring 36.

As is conventional, protective bumpers 86 may be provided on each of the legs 25 and a protective bumper 87 may be provided on the foot 32. Such bumpers may be made from a suitable plastic which is non-abrasive and will not scratch or mar the floor or like supporting surface.

Referring now to FIGURES 11-14, there is illustrated sequentially the functioning of the components of the leg release mechanism. Initially, as seen in FIGURE 11, the assembly is in storage or transportation position and plunger 38 is biased outwardly from the upright. The arm 48 is retained in the position shown by housing 14 which bears upon the extension fixed to the top of the arm.

For use, the plunger base 40 and plunger are moved inwardly into the upright upon engagement of foot 32 with the floor (FIGURE 12) until hook portion 46a on latch 46 engages lug 41 on base 40.

Upon rotation of screen housing 14, the extension on the upper end of arm 48 will be freed and the arm 48 will be biased counterclockwise as viewed in FIGURE 13. Pawl 55 will ride over the top of latch 46 until right angle lug 64 on pawl 55 is positioned beneath hook 46b. Lug or projection 64 on pawl 55 is biased toward position for engagement with hook 46b by pawl spring 58.

When the screen housing is returned to storage position from use portion, the lower end thereof will engage the extension on arm 48 and rotate the arm clockwise about bushing 71 as viewed in FIGURE 14. Lug 64 will engage hook 46b and cause latch 46 to pivot about bushing 71, thereby releasing hook 46a from engagement with lug 41 on base 40.

Upon continued movement of arm 48 clockwise, offset portion 57 of pawl 55 will engage stop 74, causing pawl 55 to pivot clockwise about pawl bushing 56, thereby releasing lug 64 from engagement with hook 46b.

The practical operation of the present invention will now be summarized. The portable projection screen assembly 10 is removed from storage and disposed in upright position as shown in FIGURE 1. The depending foot 32 is biased into position as shown in FIGURES 1 and 4 by the foot spring 62. The upright 11 is urged downwardly with respect to the floor until the hook 46a on the lower end of latch 46 engages the base 40 of plunger 38. Spring 60 biases the latch 46 into engagement with the plunger base 40. The spring 36 is retained under compression by this latching action.

When the portable projection screen assembly is raised from the floor, the legs 25 will be biased downwardly by gravity or, if desired, by suitable leg opening springs disposed between the legs and the braces. The upper leg bracket 26 will slide downwardly on the upright 11. The foot spring 62 cooperates with one of the braces and with the foot 32 to raise the foot from engagement with the floor so that it is out of the way when the stand means are set down upon the floor as shown in FIGURE 2.

The extension rod 22 is raised upwardly from the upright 11, thereby permitting the screen casing 14 to be pivoted with respect to the handle 12 and upright 11. The bail 18 affixed to the resilient member 19 on the supporting slat 20 at the top of screen 16 is affixed to a hook member on the top of the extension rod 22 and the screen is then tensioned for use.

As the screen housing was pivoted from an upright position to a horizontal position, the leg release assembly moved to the position shown in FIGURES 6 and 13. The right angle lug 64 on the leg opener pawl 55 is disposed below the hook 46b on the upper portion of the latch 46. When the arm 48 is engaged by the screen casing 14 as it is lowered from horizontal position to upright position, the arm will be moved clockwise as seen in FIGURES 6 and 14. The right angle lug on the leg opener pawl 55 will engage the hook 46b on the top of the latch 46 and cause the latch 46 to be pivoted clockwise as viewed in FIGURES 6 and 14. The hook 46a on the lower end of the latch will be released from engagement with the plunger base 40, permitting the spring 36 to bias the plunger base 40 downwardly into engagement with the short legs 42 on the braces 30. The weight of the portable projection screen assembly resting on the legs will prevent the legs from moving to retracted position. However, when the portable projection screen assembly 10 is raised from the supporting surface, the spring 36 acting through plunger 38 will move the short legs to pivot the braces 30 inwardly and thereby raise the legs 25 from extended position to retracted position as shown in FIGURE 1.

By the present invention, there has been provided a portable projection screen assembly having unique means for automatically retracting the extended stand means which support the vertical column or upright in position for use. The retracting means are operable independently from the extension rod by a biased plunger mechanism cooperatively engageable and releaseable from a latch operative in response to movement of a leg release arm and pawl means. The construction is relatively foolproof and is dependable in use.

While I have described a presently preferred embodiment of my invention, it will be understood that the invention is not limited thereto since it may be otherwise embodied within the scope of the following claims.

I claim:

1. For use in a portable projection screen assembly including a supporting column, a screen housing supported on said column for movement between storage and use positions, and stand means including a plurality of legs movably carried on said column for movement between extended column-supporting position and retracted storage position; improved means for automatically retracting the legs from extended column-supporting position on a supporting surface to retracted storage position, said retracting means comprising biased plunger means movable outwardly from said column for urging said legs to retracted position, said biased plunger means comprising a coil spring in said column and a plunger engaging said spring at one end and having the other end extending outwardly from said column, a foot member on said plunger movable into a position in alignment with said plunger for engagement with said supporting surface for moving said plunger means inwardly into said column to compress said spring, latch means for holding said plunger to maintain said spring compressed and to permit extension of said legs, said foot member being movable out of alignment with said plunger to permit the legs to support said column on said supporting surface, and latch release means on said column engaged by said screen housing in response to movement of said screen housing from storage to use position to release said latch means from said plunger, whereby when the screen assembly is raised from the supporting surface the legs are automatically retracted.

2. In a portable projection screen assembly having a tubular supporting column, a screen housing supported on said column for movement between storage and use position, and stand means on said column including a pair of brackets carried by said column, a plurality of legs pivoted on one of said brackets, and a plurality of braces pivotally connected to the other of said brackets and to the legs, said legs being movable between extended column-supporting position and retracted storage position; improved means for automatically retracting the legs after use when the screen assembly is raised from a supporting surface comprising a spring in said column, a plunger slidably carried in said column and biased by said spring for engaging said braces to move said legs to retracted position, foot means on said plunger for engaging said supporting surface to cock the plunger during setup of the screen assembly, a latch pivoted on said column for retaining said plunger cocked, latch release means on said column engaged by said screen housing responsive to movement of said screen housing from use position to storage position to actuate said latch to release said biased plunger, whereby when the screen assembly is raised from the supporting surface, the legs are automatically retracted.

3. A portable projection screen assembly as in claim 2 including resilient means for biasing said latch means to plunger-engaging position, said latch release means including an arm pivoted on said column and a release pawl pivoted on said arm and engaging said latch for pivoting it to release said latch from engagement with said plunger when said screen housing is moved to storage position.

4. In a portable projection screen assembly including a tubular member having stand means at its lower end for supporting the member on a supporting surface, a screen casing pivotally carried on said member for movement from storage position to operating position, screen means carried in said screen casing and being biased to roll up the screen to rolled up position and permitting the screen to be unrolled to unrolled position, extensible means on said member for supporting said screen in unrolled position, said stand means including a plurality of legs movably carried on said member for movement between an extended member-supporting position and a folded storage position relative to said member, the improvement comprising means for automatically retracting the stand means after use from member-supporting position to storage position, said retracting means including a plunger for actuating said legs, a coil spring within said member operative with said plunger to urge said legs to storage position, foot means on said plunger constructed and arranged to compress said coil spring when said member is moved downwardly with respect to said foot means to release said legs for movement to the member-supporting position, latch means for maintaining the coil spring compressed to permit movement of said legs to the member-supporting position, arm and pawl means operative in response to movement of said screen casing from operating position to storage position to release said latch means and thereby cause said plunger to urge said legs to storage position, said arm and pawl means comprising a lever arm and a pawl pivotally supported on said arm, said arm and latch means being pivoted on said member about a common axis, said pawl being adapted to engage said latch means for pivoting same to release said latch means from said plunger and permit movement of said plunger outwardly from said member whereby when the projection screen assembly is raised from engagement with the supporting surface, the legs are automatically moved to storage position.

5. In a portable projection screen assembly including a vertical column having stand means at its lower end for supporting said column on a supporting surface, a screen casing pivotally carried on said column for movement from storage position to operating position, screen means carried in said screen casing and being biased to roll up the screen to rolled up position and permitting the screen to be unrolled to unrolled position, extensible means on said column for supporting said screen in unrolled position, said stand means including a plurality of legs movably carried on said column for movement between an extended column-supporting position and a folded storage position relative to said column, the improvement comprising means for automatically retracting the stand means after use from column-supporting position to storage position, said retracting means including a plunger in the column movable outwardly from said column for actuating said legs to storage position, a coil spring in said column biasing said plunger to urge said legs to storage position, a foot pivoted on said plunger and being movable to an axially aligned position with said column into engagement with said supporting surface for moving said plunger to compress said coil spring when said column is moved downwardly with respect to said foot to release said legs for movement to the column-supporting position, latch means pivoted on said column for holding said plunger to maintain the coil spring compressed and permit movement of said legs to the column-supporting position, arm and pawl means on said column engaged by said screen casing during movement of said screen casing from operating position to storage position to pivot said latch means and release said plunger for movement outwardly from said column to urge said legs to storage position, whereby when the projection screen assembly is raised from engagement with the supporting surface, the legs are automatically moved to storage position.

6. A portable projection screen assembly as in claim 5 including spring means between said arm and pawl means and said latch means for biasing said latch means toward plunger latching position.

7. In a portable projection screen assembly comprising a vertical column having stand means at its lower end, an elongated screen housing having a roller-mounted flexible screen therein and pivotally mounted on said column for movement between storage position and operating position, extensible means slidably mounted in said column and movable between a raised position for supporting said screen in unrolled position and a lowered position for locking the screen housing in its storage position, the improvement comprising a pair of brackets on said column, a plurality of legs pivotally connected to one of said brackets, a plurality of braces pivotally connected at one end to the legs and adjacent the other end to the other of said brackets, said legs being movable between an extended column-supporting position and a folded storage position relative to said column, actuating means including a plunger slidable in said column and fixed against rotation in said column, a bias spring in said column for engaging the plunger for urging said legs to folded storage position, said plunger extending beyond said column, short leg means on said braces engaged by the plunger to pivot said braces and move said legs to folded storage position responsive to the force of said bias spring, foot means operatively associated with said actuating means for compressing said bias spring to release said plurality of legs for movement to the column-supporting position, said foot means being pivoted on said plunger, link means operative between the braces and said foot means for positioning said foot means in axial alignment with said column for compressing said bias spring and for moving said foot means out of alignment with said column when said legs are extended, and leg release means on said column operatively associated with said actuating means and including a latch for engaging said actuating means to maintain said bias spring compressed while said legs are moved to column-supporting position, said latch being moved when said screen casing is pivoted to storage position to release said actuating means for automatically raising said stand means to said folded storage position when said projection screen assembly is lifted from engagement with a supporting surface.

8. In a portable projection screen assembly comprising a vertical column having stand means at its lower end, an elongated screen housing having a roller-mounted flexible screen therein and pivotally mounted on said column for movement between storage position and operating position, extensible means slidably mounted in said column and movable between a raised position for supporting said screen in unrolled position and a lowered position for locking the screen housing in its storage position, the improvement comprising a pair of brackets on said column, a plurality of legs pivotally connected to one of said brackets, a plurality of braces pivotally connected at one end to the legs and adjacent the other end to the other of said brackets, said legs being movable between an extended column-supporting position and a folded storage position relative to said column, actuating means including a bias spring for urging said legs to folded storage position, foot means operatively associated with said actuating means for compressing said bias spring to release said plurality of legs for movement to the column-supporting position, and leg release means on said column operatively associated with said actuating means and including a latch pivoted on said column for engaging said actuating means to maintain said bias spring compressed while said legs are moved to column-supporting position, said latch being moved when said screen housing is pivoted to storage position to release said actuating means for automatically raising said stand means to said folded storage position when said projection screen assembly is lifted from engagement with a supporting surface, said leg release means including an arm pivoted on said column and a latch-engaging pawl pivoted on said arm, and pawl-engaging stop means on said column, said arm being engaged by said screen housing and being movable responsive to movement of said screen housing from operating position to storage position to cause said pawl to engage said latch to release said latch from said actuating means, said pawl being pivoted free from engagement with the latch upon engagement of said pawl with said stop means.

References Cited by the Examiner
UNITED STATES PATENTS

| | | | |
|---|---|---|---|
| 2,386,450 | 10/1945 | Eller | 248—171 X |
| 3,164,348 | 1/1965 | Armstrong | 248—171 |
| 3,164,349 | 1/1965 | Armstrong | 248—171 |

CLAUDE A. LE ROY, *Primary Examiner.*

JOHN PETO, *Examiner.*